Dec. 5, 1961    R. C. FRICK ET AL    3,011,483
ROTARY ACTUATOR
Filed Oct. 15, 1959    4 Sheets-Sheet 1

INVENTORS
RAYMOND C. FRICK
FRANCIS R. ROGERS
BY
William S. Thompson
AGENT

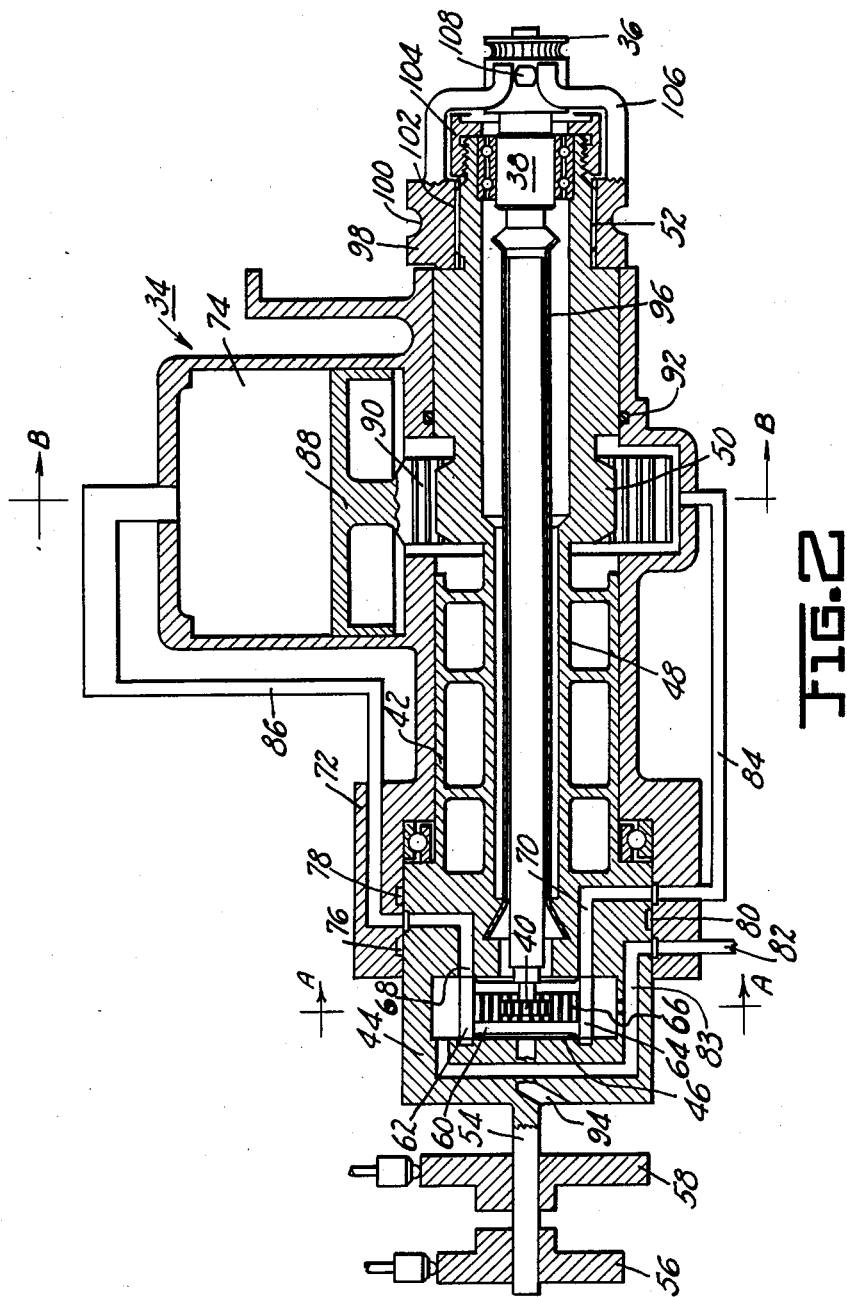

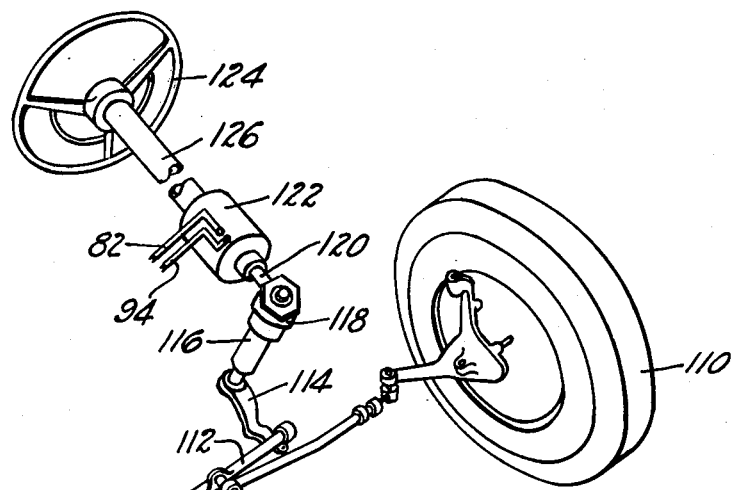
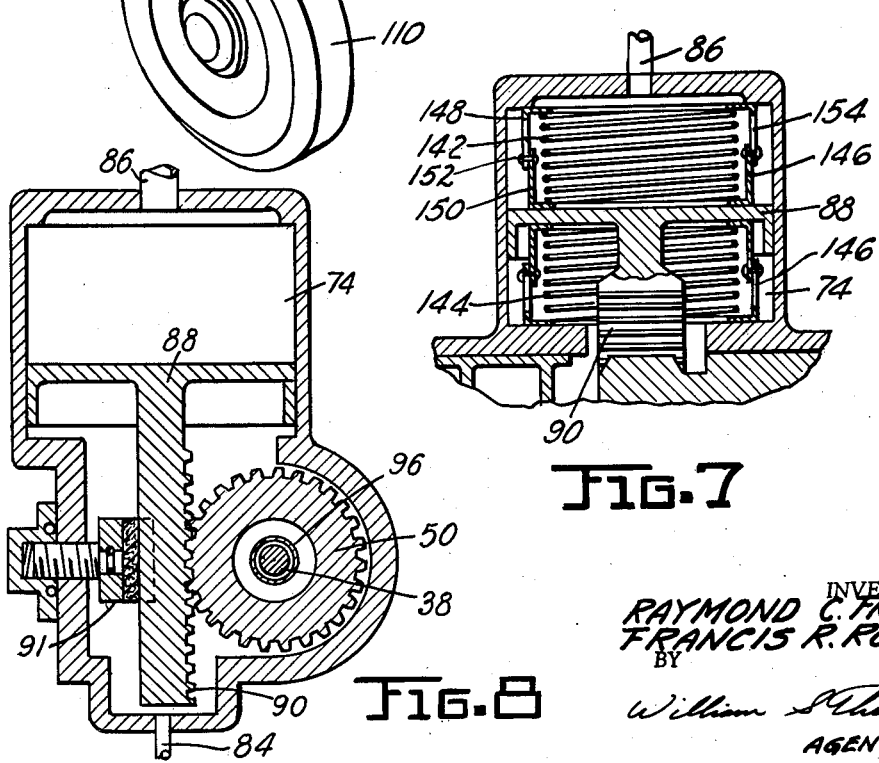

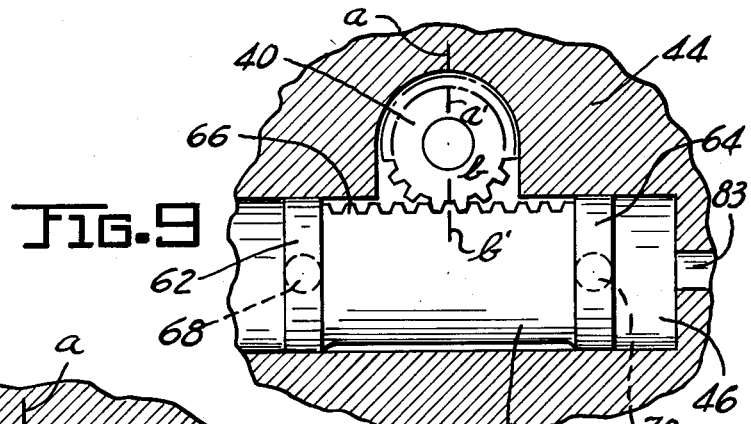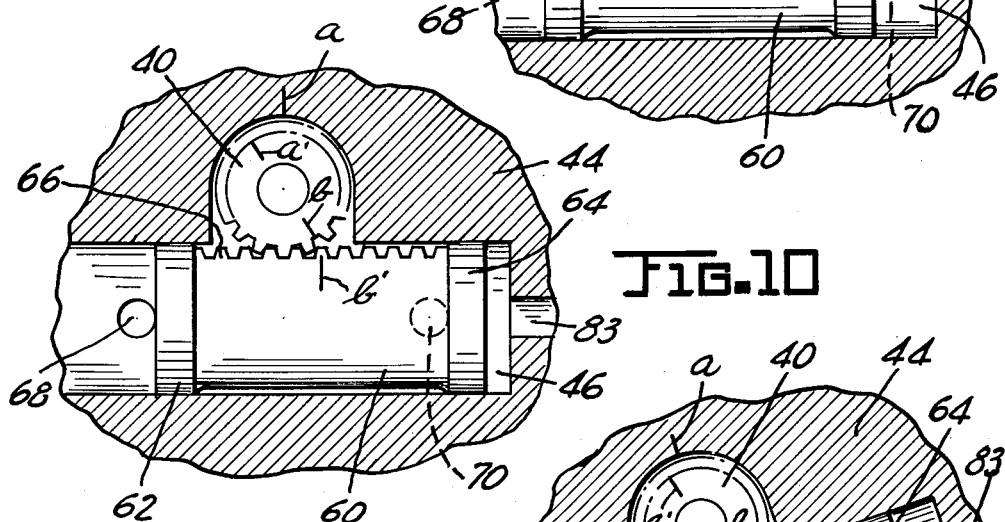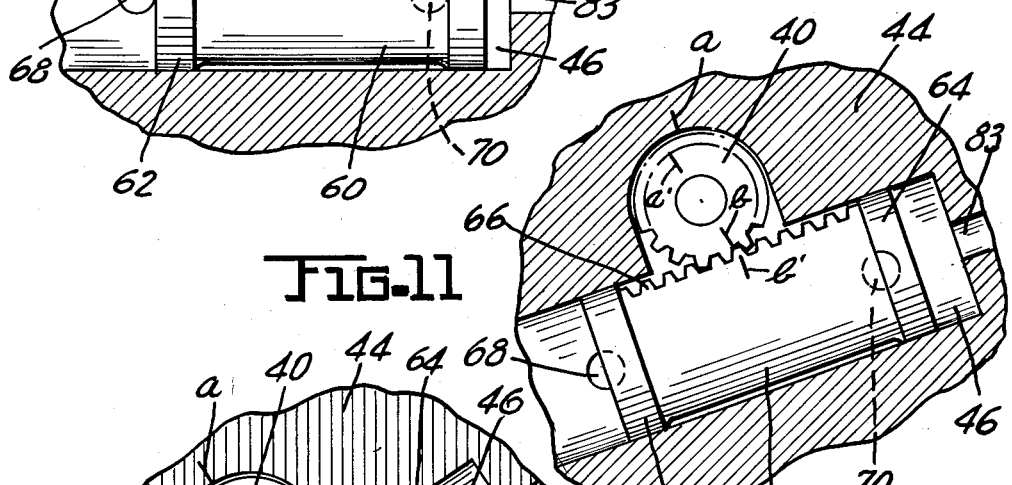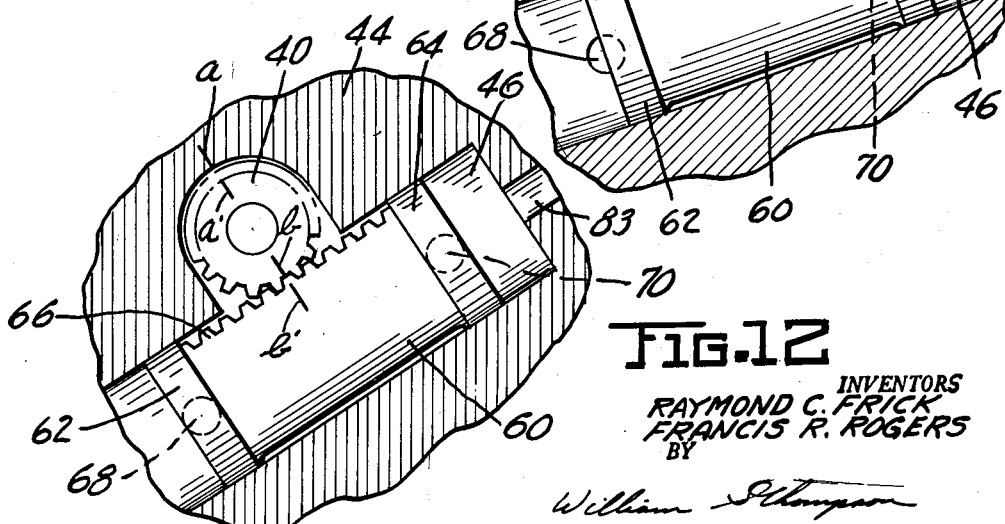

United States Patent Office 3,011,483
Patented Dec. 5, 1961

3,011,483
ROTARY ACTUATOR
Raymond C. Frick and Francis R. Rogers, South Bend, Ind., assignors to The Bendix Corporation, a corporation of Delaware
Filed Oct. 15, 1959, Ser. No. 846,593
19 Claims. (Cl. 121—41)

The present invention relates to a rotary actuator and more particularly to a rotary actuator of the hydraulic servo type for transmitting and amplifying torque or rotary position signals.

It is an object of the present invention to provide a rotary actuator having a control valve adaptable to receive a rotational input signal and which controls a rotary output member.

It is another object of the present invention to provide a rotary actuator of the hydraulic type which does not require drag producing seals acting on the input member.

It is another object of the present invention to provide a rotary actuator which may be used with a hydraulic control device and is adaptable to provide a first rotary output which may be used internally in said control device and a second rotary output which may be used external to said control device.

It is another object of the present invention to provide a rotary actuator of a highly compact and improved design.

It is a further object of the present invention to provide a rotary actuator having a plurality of uses.

Other objects and advantages of the present invention will become apparent from an analysis of the description and the appended drawings wherein:

FIGURE 2 is a section view in detail of a preferred embodiment of the present invention;

FIGURE 4 illustrates an automative power steering system incorporating the rotary actuator of the present invention;

FIGURE 7 shows a modification of the servo piston of the FIGURE 2 embodiment;

FIGURE 8 is a section view taken along section B—B of FIGURE 2 to better illustrate a servo piston of the present invention; and FIGURES 9 through 12 are partial section views taken at section A—A to illustrate relative alignment of the parts for progressive rotational positions of our rotary actuator.

Figure 1:
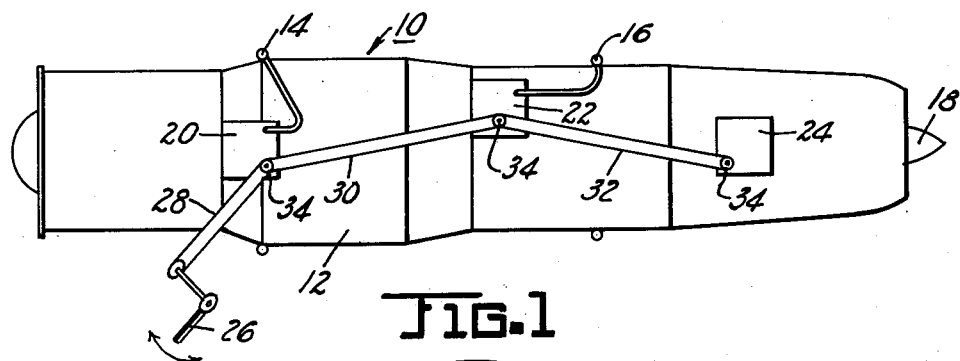
FIGURE 1 is a schematic illustration of an engine control system incorporating a plurality of rotary actuators in accordance with the teachings of the present invention.

Referring to FIGURE 1, a gas turbine engine 10 is shown including an outer casing 12, a main fuel manifold 14, an afterburner manifold 16, and a movable member 18 for varying the exhaust nozzle area. The operation of an engine of the class shown can be effectively controlled by a plurality of separately housed control devices such as a main fuel control 20 which controls the rate of fuel flow to main fuel manifold 14; an afterburner fuel control 22 which controls the rate of fuel flow to afterburning manifold 16; and a nozzle area control 24 which may manipulate suitable internal linkages to vary the position of member 18. The location of the control devices on the engine casing 12 may be dictated either by space or functional requirements such that the devices are located remotely with respect to each other. A pilot actuated signal is transmitted by means of the throttle 26 to the various control devices 20, 22 and 24 by means of flexible cables 28, 30 and 32. The force opposition to movement of lever 26 may be reduced by utilizing rotary power amplification actuators 34 as component parts of the various control devices.

Figure 3:
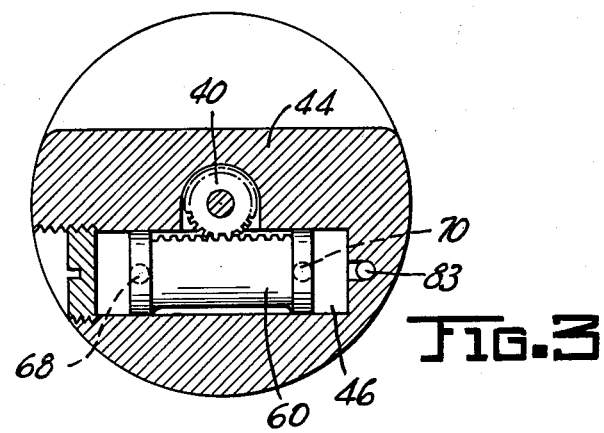
FIGURE 3 is a section view taken along section A—A of FIGURE 2 to illustrate a control valve mechanism.

In FIGURE 2, there is shown in somewhat greater detail a rotary actuator in accordance with the teachings of the present invention of the type which may be suitably used at location 34 of the engine control system shown in FIGURE 1. The rotary actuator 34 includes a pulley member 36 for receiving an input signal such as might be received from any of the cables 28, 30 and 32 of the system shown in FIGURE 1. Pulley 36 is integrally connected to the longitudinally disposed rod member 38 which has a pinion gear 40 formed on the opposite end thereof. A rotary output member 42 is comprised of a first valve housing segment 44 including chamber 46 and the second hollow shaft segment 48 arranged concentric with the rod member 38. The hollow shaft segment 48 includes a first and second gear formed thereon bearing the numerals 50 and 52 respectively. The valve chamber 46 in valve housing segment 44 has a center line arranged transversely from that of rod member 38 and offset therefrom such that the center lines of chamber 46 and rod 38 form perpendicular but nonintersecting lines. This relationship of center lines can best be seen in FIGURE 3 where it is observed that the axial center of member 40 which is coincident with that of member 38 is offset from the axial center of chamber 46 which as viewed in FIGURE 3 would be approximately parallel with the elevation of ports 68 and 70. Rotary output member 42 further includes a rod projection 54 at the left end thereof for conveniently transmitting an output signal to the cams 56 and 58. A control valve 60 having land projections 62 and 64 and tooth rack 66 formed thereon is slideably disposed in the valve chamber 46 such that the axis along which said control valve slides is in a transverse relationship with the center line of rod 38. With the valve 60 in the position shown in FIGURE 2, the land projections 62 and 64 are operative to close conduits 68 and 70 formed in said valve housing segment. A fixed housing member 72 is provided and forms a piston chamber 74 and additionally provides a rotational thrust bearing support for the rotatable output member 42 which is concentrically mounted on the interior of housing 72. Housing 72 further includes an annular projection at the left end thereof which is in sealing contact with valve housing segment 44, which projection includes first and second annular grooves 76 and 78 respectively. A third annular groove 80 is provided intermediate to said first and second grooves and is formed in the valve housing segment 44. A relatively high pressure regulated control fluid is supplied from a source, not shown, to the conduit 82 formed in housing 72 where it is transmitted to the first annular groove 76. Regulated pressure fluid is transmitted from annular groove 76 by means of a conduit 83 formed in the valve housing segment 44 to opposite ends of the valve chamber 46 where it communicates with the exterior surface of land projections 62 and 64. Conduits 70 and 68 formed in the valve housing segment 44 and communicating with the valve land projections 64 and 62 respectively are further connected to the annular grooves 78 and 80 respectively. The conduits 84 and 86 which are formed in part within housing 72 and part external to housing 72 connect the annular grooves 78 and 80 with opposite ends of piston chamber 74. A piston member 88 and integrally formed rack member 90 are disposed in piston chamber 74 wherein the rack member 90 engages the teeth of first gear 50 so that the rotary output member 42 is rotationally positioned in response to movement of piston 88. It will be noted that the rack 90 tangentially engages gear 50 and moves along an axis of movement transverse and offset from the centerline of rod 38. Referring momentarily to FIGURE 8, a section view of piston 88, rack 90 and gear 50 illustrates the previously mentioned tangential engagement. A rack guide or cradle member 91 or similar means is shown to stabilize the movement of rack 90 and insure full tooth engagement with gear 50. An O-ring seal 92 is provided between the housing 72 and rotary output member 42 to the right of rack member 90 to prevent external fluid leakage. The rotary actuator 34 is adapted to be immersed in fluid which may be contained in any one of the control devices 20 through 24 of FIGURE 1 in which event a relatively low pressure fluid will be transmitted by means of conduit 94 formed in the valve housing segment 44 to the chamber 46 intermediate to the land projection 62 and 64. However, it should be understood that this is a matter of choice and a separate low pressure fluid source may be provided. For purposes of the operation of the rotary actuator 34, conduit 94 forms a dump conduit for fluid that flows past projections 62 and 64. A torque tube 96 encases rod 38 and is rigidly connected on its left end to rotary output member 42 and at its right end to rod 38 by any convenient means such as for example by welding. Tube 96 has a duo function of preventing fluid leakage from chamber 46, and to provide a force which opposes the movement of rod 38 with respect to output member 42. An annular ring member 98 having a cable groove 100 formed on its outer circumferential surface engages gear 52 on its inner surface by means of teeth 102 formed thereon. A retaining nut 104 is threadedly secured to the right end of the shaft segment 48 of the rotary output member 42 to secure said annular ring in place. Annular ring 98 further includes yoke projections 106 to bracket either side of pin projection 108 which is anchored at its base in the pulley 36. A predetermined clearance distance is provided between the pin projection 108 and yoke projections 106.

*Operation*

Assuming the rotary actuator 34 to be in a stabilized position of operation, the land projections 62 and 64 of the control valve 60 are operative to obstruct the openings of conduits 68 and 70 such that the fluid pressures acting on either side of piston 88 are equal and said piston has no tendency to move. Further, under a stabilized condition of operation pin projection 108 is in a mid position between the projections 106 of annular ring 98. As pulley 36 is rotated by an input signal at a moderate rate, pinion gear 40 formed on the left end of rod 38 will follow the movement of pulley 36 and position control valve 60 either upward or downward depending on the direction of rotation. Assuming the direction of rotation to be such that control valve 60 is moved downwardly as viewed in FIGURE 2, the opening of conduit 68 will be uncovered and receive a relatively high pressure control fluid contained in the chamber above land projection 62. Simultaneously, the opening of conduit 70 will be uncovered and receive the relatively low pressure control fluid contained intermediate to the land projections 62 and 64. Thus by means of conduits 86 and 84 high pressure fluid will be supplied to the upper surface of piston 88 and low pressure fluid supplied to the lower surface of said piston, FIGURE 2, to provide a fluid pressure differential tending to move said piston downwardly. Movement of piston 88 downwardly transmitted through rack 90 and gear 50 rotates the rotary output member 42 which tends to bring the openings of conduits 70 and 68 back into alignment with the land projections 64 and 62 respectively. The above described tendency can be best understood by referring to FIGURES 9 through 12 which are partial section views taken along line A—A drawn through the control valve 60 of FIGURE 2 wherein like parts are identically numbered. In the FIGURES 9 through 12 scribe lines a and a' are marked on housing segment 44 and pinion gear 40 respectively to indicate relative movement of the parts between the various views whereas scribe lines b and b' are affixed to pinion gear 40 and piston 60 respectively to indicate relative movement. In FIGURE 9 valve 60 is shown in its balanced or "null" position wherein lands 62 and 64 equally cover ports 68 and 70 equalizing the pressure on servo piston 88. Scribe lines a—a' and b—b' are aligned in the balanced or null condition. As pinion gear 40 is rotated by an input signal, counterclockwise as viewed in FIGURE 9, it will displace piston 60 to the right uncovering ports 68 and 70, exposing port 68 to high pressure and 70 to low pressure, as illustrated in FIGURE 10. Note that in the unbalanced condition represented in FIGURE 10, the scribe lines no longer line up. High pressure from port 68 flows through passage 86 to the upper side of piston 88, FIGURE 2, to actuate the piston downwardly as viewed in both FIGURES 2 and 8. Downward movement of piston 88 transmitted through rack 90 rotates gear 50 counterclockwise as viewed in FIGURE 8. Gear 50 being integral with housing 44 and the view being taken in the same direction as FIGURES 9 through 12, housing 44 will also rotate counterclockwise, see FIGURE 11 where scribe a is displaced off the vertical due to movement of housing 44. As housing 44 rotates counterclockwise piston 60 is moved in a direction tending to realign scribes b—b' and ports 68 and 70 move relatively towards land projections 62 and 64. In FIGURE 12 the actuator has again achieved balance or "null" with all scribes aligned, however, all scribes have been displaced rotationally from the vertical position illustrated in FIGURE 2. If the rate at which an input signal is provided to pulley 36 it exceeds a moderate amount, or if the servo operation of the system should fail, pin projection 108 will engage the projection 106 to directly drive the rotary output member 42. The rate at which the direct drive feature becomes operative is a matter of design, selectable to suit individual installation requirements and controllable by the clearance distance provided between projection 106 and pin projection 108. Since relatively little force is necessary to position the control valve 60, torque tube 96 is provided to produce a small force opposition to the input signal which provides the operator with a sense of feel. The magnitude of the force opposition provided by torque tube 96 is proportional to the rate at which the input signal is applied. First and second power amplified output signals may be derived from the actuator 34 described above. A first output signal for use interiorly in the control devices 20 through 24 may be received in the cams 56 and 58 secured to the rod projection 54 of the rotary output member 42. A second exterior output may be derived by means of a cable inserted in the cable groove 100 formed on the outer surface of annular ring member 98. If it is desired to use the rotary actuator 34 as a power amplification device alone, rod projection 54 may be removed and the singular output from annular ring member 98 used.

FIGURE 4 illustrates a second application of our rotary actuator in an automotive power steering installation. A pair of dirigible wheels 110 having a controllable linkage network 112 which is controlled by pitman arm member 114 which is rotatable through a selected arc. A shaft member 116 interconnects said pitman arm member and reduction gears contained in housing 118. The input to the reduction gears is provided by the shaft 120 which extends from the housing 122. The housing 122 forms a suitable covering for our rotary actuator 34 and the shaft 120 is an enlarged extension of rod projection 54 as shown in FIGURE 2. An input is provided to the rotary actuator contained in housing 122 by means of steering wheel 124 in shaft 126 which is secured to the pulley member 36 of the rotary actuator illustrated in FIGURE 2. High pressure control fluid is supplied by conduit 82, and conduit 94 provides a return fluid conduit as previously disclosed. In an installation of this type there would be no need to take a second output from the annular ring member 98 and thus the interconnecting cables may be dispensed with.

Figures 5, 6:
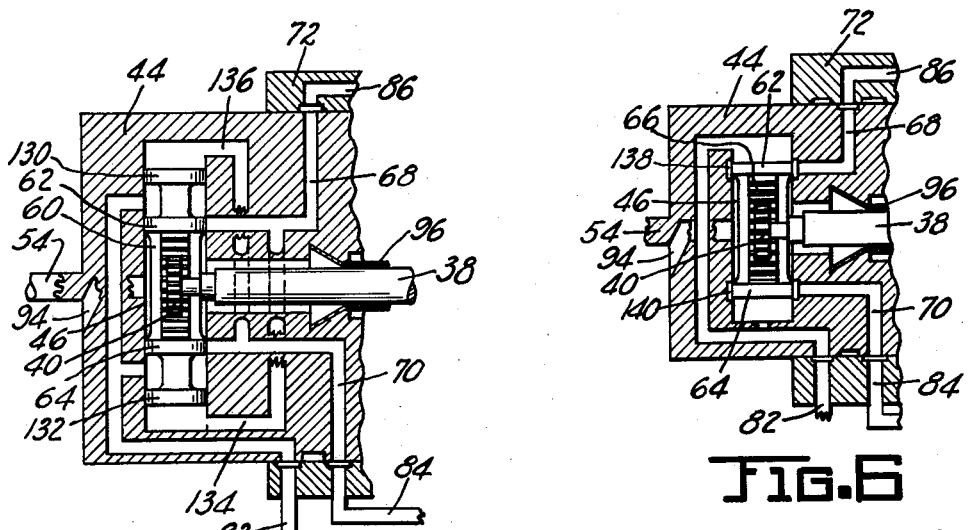
FIGURE 5 shows in section a modified portion of the control valve mechanism of FIGURE 2.
FIGURE 6 shows in section another modified portion of the control valve mechanism of FIGURE 2.

FIGURE 5 shows a section of a modified portion of the control valve mechanism of FIGURE 2 which is particularly suitable for a power steering installation such as illustrated in FIGURE 4. Control valve 60 includes a third and fourth land projection 130 and 132 respectively formed on the opposite ends thereof. A conduit 134 transmits control fluid from conduit 68 to the chamber below land projection 132 where said control fluid is operative to act on the face of said land projection producing a force acting upwardly on the control valve 60. Another conduit 136 transmits fluid from conduit 70 to the chamber on the upper side of land projection 130 to similarly provide a control fluid pressure acting on the surface of land projection 130 tending to urge control valve 60 in a downward direction. Thus a control valve 60 moves downwardly in response to an input signal such that high pressure control fluid is supplied to conduit 68 and low pressure fluid to conduit 70, the conduits 134 and 136 are operative to supply a fluid pressure differential acting on the opposite ends of control valve 60 at the land projections 130 and 132 which is operative to urge control valve 60 upwardly or in a direction which opposes the input signal. The magnitude of the force opposition to the movement of control valve 60 is proportional to the degree said control valve deviates from its null position thus providing the operator who is manipulating the steering wheel 124 of FIGURE 4 with a sense of feel as to how far his wheels 110 are deviating from a straight ahead position. In addition, if the wheels 110 are aligned so as to be self-centering when a vehicle containing said steering mechanism is in motion, the force differential acting on land projections 130 and 132 will be operative to restore control valve 60 to its null position automatically on release of the wheel 124 by the operator.

FIGURE 6 shows in section a second modified view of the control valve mechanism of FIGURE 2 wherein annular grooves 138 and 140 form the openings of conduits 68 and 70 respectively, and are operative with the land projections 62 and 64. The width of said annular grooves as illustrated, is greater than the land projections 62 and 64 to provide an "open center" control valve wherein the control fluid pressure is permitted to continuously circulate through conduits 82, 84, grooves 138 and 140, and return conduit 94. An installation of this type permits the use of positive displacement pressurizing pumps for supplying the control fluid to conduit 82 inasmuch as the flow of control fluid at no time becomes static. It is to be noted that the width of the openings of conduits 68 and 70 in the FIGURE 2 embodiment is not greater than land projections 62 and 64, thus forming "closed center" valve operation wherein control fluid is static when valve 60 is in a null position.

FIGURE 7 shows a modification of a servo piston 88 wherein first and second centering springs 142 and 144 are provided and disposed in chamber 74 on the upper and lower sides of piston 88 respectively. Retainer assemblies 146 encase said springs and are comprised of telescoping portions 148 and 150. A pin 152 is rigidly secured to the inner telescoping portion 150 and rides in the slot 154 formed in the outer telescoping portion 148. Thus the retaining assemblies 146 are operative to permit springs 142 and 144 to expand to the position illustrated, but no further. Compression of springs 142 and 144 is permitted by the telescoping operation of said retainer assemblies. The springs 142 and 144 are operative to provide equal and opposite forces to the piston 88 when said piston is in the mid position as illustrated in FIGURE 7. However, as piston 88 is moved from said mid position by operation of the fluid pressure forces controlled by a control valve 60, a force will be generated opposing movement of said piston. Thus said springs will provide a force tending to restore piston 88 to a particular position which may correspond to the straight ahead position of wheels 110 illustrated in FIGURE 4. The restoring action provided by said springs will thus be operative to center said wheels regardless of the alignment thereof.

Although the instant invention has been shown with a certain degree of particularity, it should be understood that the disclosed embodiments were made by way of example only, and that various changes in form and relative arrangement of parts may be made to suit individual requirements. The invention is particularly suitable for any installation requiring a highly compact rotary output servo mechanism which requires one or more of the advantages disclosed.

We claim:

1. A rotary actuator including a fluid motor, said fluid motor having a movable fluid pressure responsive piston member and a fixedly secured housing, a rotary movable driven member connected to said piston, a slidable control valve disposed in said driven member and spatially located so that the axis of rotation of said driven member and the axis along which said control valve slides form perpendicular non-intersecting lines, said driven member further including passage means for transmitting fluid under pressure to either of opposed sides of said piston member, said control valve further disposed in said driven member to partly define said passage means and for selectively controlling the delivery of pressurized fuel to one of said opposed sides, and an input member connected to said control valve and operative to slidably position said control valve as a function of in input signal.

2. A rotary actuator including a servo motor, a movable control valve, a rotary output member connected to said servo motor and rotationally positionable in response to the movement thereof, said control valve spatially located with respect to said output member so that the axis along which said control valve moves and the axis of rotation of said output member form perpendicular non-intersecting lines, passage means formed in said output member operative to transmit an operative fluid pressure to said servo motor, said passage means operative with said control valve to jointly control said operative fluid pressure as a function of the relative positions of said control valve and said passage means, and input means operative to position said control valve in response to a rotational input signal.

3. A rotary actuator including a movable control valve, a rotary output member having an axis of rotation, servo means operatively connected to said rotary output member for controlling the rotational position of said output member, passage means interconnecting said control valve and said servo means so that said servo means is controlled by said control valve, said control valve contained in said output member and located spatially with respect to the axis of rotation of said output member such that the axis along which said control valve moves relative to said output member forms a perpendicular non-intersecting line with said first named axis, and input means operatively connected to said control valve to position said valve in response to a rotational input signal.

4. A rotary actuator as claimed in claim 3 wherein said control valve is a closed-center valve.

5. A rotary actuator as claimed in claim 3 wherein said control valve is an open-center valve.

6. A rotary actuator as claimed in claim 3 wherein said input means is a torque tube force transmitting device disposed within said rotary output member.

7. A rotary actuator as claimed in claim 6 wherein said torque tube force transmitting device is disposed along the axis of rotation of said rotary output member.

8. A rotary actuator as claimed in claim 6 wherein said torque tube force transmitting device is interconnected to said control valve by means of a rack and pinion gear arrangement.

9. A rotary actuator as claimed in claim 7 including a direct drive connection interconnecting said torque tube device and said rotary output member to directly position said rotary output member as a function of the input signal on failure or when the response rate of said servo means is exceeded.

10. A rotary actuator comprised of: a rotary output member having a first valve housing segment and a second tubular extension segment, servo piston means including a rack member tangentially connected to said output member to control the rotational position thereof, a control valve disposed in said housing segment and movable in a transverse direction to the axis of rotation of said output member and offset therefrom, passage means connected to said servo piston means and including a control fluid orifice formed in said valve housing segment adjacent said control valve to define a variable size orifice with said control valve operative to control said servo piston means, and an input member contained within said tubular extension segment, said input member extending into said housing segment on one end and connected to said control valve for controlling the position thereof, said input member extending externally from said tubular segment on the other end to conveniently receive a rotational input signal.

11. A rotary actuator as claimed in claim 10 wherein said input member is a torque tube force transmitting device.

12. A rotary actuator for use with a plurality of separately housed control devices comprising: an output member adapted to being rotationally mounted through a housing wall of one of said control devices, servo means drivably connected to said output member and operative to rotationally position said output member, a control valve disposed within said output member and having a null position, passage means interconnecting said control valve and said servo means, said control valve operative to control said servo means so that the direction and rate of rotation of said output member is a function of the direction and degree of deviation of said control valve from its null position, first output means connected to said output member internal to said one of the plurality of control devices, second output means connected to said output member external to said one of the plurality of control devices, said second output means further connected to a second of said plurality of control devices, and input means operative to position said control valve in response to an input signal.

13. A rotary actuator as claimed in claim 12 wherein said input means is contained within said output member and is a torque tube device having fluid sealing means producing resistance to the input signal proportional to the system error or deviation between the position of input means and output member.

14. A rotary actuator for positioning vehicle wheels of the self-centering type in response to a manual steering input, the combination of a rotary output member connected to said wheels to position said wheels in either of two directions from a normal position, a servo piston and rack member connected to said rotary output member to control the position thereof, a slidable spool control valve having a first and a second set of land projections formed thereon, first passage means formed in said rotary output member operative to transmit an operating fluid pressure to said servo piston, said spool control valve disposed in said rotary output member adjacent said first passage means so that said first set of land projections is operative to control the admission of operating fluid pressure to said first passage means, second passage means connected to said first passage means and said second set of land projection to transmit the operating fluid pressure to act on said spool control valve to provide a force acting on said spool valve tending to position said wheels towards their normal position, and means interconnecting said manual steering input and said spool control valve.

15. A rotary actuator for positioning an output device wherein said output device has a normal position and force producing means tending to return said output device to said normal position comprising, a rotary member connected to said output device operative to position said device, a servo motor responsive to a fluid pressure, said servo motor being drivably connected to said rotary member and operative to position said rotary member, a control valve operative with said rotary member to produce an actuating fluid pressure that varies as a function of the relative position of said control valve and said rotary member, first passage means transmitting said actuating fluid pressure to said servo motor, second passage means transmitting said actuating fluid pressure to said control valve to provide a force acting on said control valve tending to position said control valve in a direction returning said output device to its normal position, and input means operative to position said control valve in response to an input signal.

16. A rotary actuator as claimed in claim 15 wherein said control valve is of the slidable type, and the axis along which said control valve slides forms a perpendicular non-intersecting line with the axis of rotation of said rotary member.

17. A rotary actuator as claimed in claim 15 wherein said force acting on said control valve is transmitted through said input means to provide resistance to movement of said input means proportional to the deviation of the output device from its normal position.

18. A rotary actuator for positioning an output device wherein said output device has a normal position comprising, a rotary member connected to said output device operative to position said device, a servo motor responsive to a fluid pressure, said servo motor being drivably connected to said rotary member and operative to position said rotary member, resilient means producing a force acting on said servo motor tending to return said servo motor to a position corresponding to the normal position of said output device, a control valve operative with said rotary member to produce an actuating fluid pressure that varies as a function of the relative position of said control valve and said rotary member, passage means transmitting said actuating fluid pressure to said servo motor, and input means operative to position said control valve in response to an input signal.

19. A rotary actuator as claimed in claim 18 wherein said resilient means is comprised of a first and second spring member acting on opposite sides of said servo motor.

References Cited in the file of this patent
UNITED STATES PATENTS

| | | |
|---|---|---|
| 786,652 | Larsson | Apr. 4, 1905 |
| 2,579,566 | Godfrioux | Dec. 25, 1951 |
| 2,640,322 | Puerner | June 2, 1953 |
| 2,874,542 | Tear | Feb. 24, 1959 |